April 3, 1951 — G. F. BELLAIRS ET AL — 2,547,617

COMMUNICATION CHANNEL IDENTIFICATION IN TELEPHONE OR LIKE SYSTEMS

Filed Jan. 24, 1948 — 4 Sheets-Sheet 1

Inventors
Guy Ffarington Bellairs
John Charles Ireland
by Dezsof Steinberg
Attorney April 3, 1951

G. F. BELLAIRS ET AL

COMMUNICATION CHANNEL IDENTIFICATION IN TELEPHONE OR LIKE SYSTEMS 2,547,617

Filed Jan. 24, 1948

4 Sheets-Sheet 2

Inventors
Guy ffferington Bellairs
John Charles Ireland
by Dezsö Steinberg
Attorney April 3, 1951 G. F. BELLAIRS ET AL 2,547,617

COMMUNICATION CHANNEL IDENTIFICATION IN TELEPHONE OR LIKE SYSTEMS

Filed Jan. 24, 1948 4 Sheets-Sheet 3

Inventors
Guy ffarington Bellairs
John Charles Ireland
by Dezsoe Steinherz
Attorney Inventors
Guy ffarington Bellairs
John Charles Ireland
by Dezsoe Steinberg
Attorney Patented Apr. 3, 1951

2,547,617

UNITED STATES PATENT OFFICE 2,547,617

COMMUNICATION CHANNEL IDENTIFICATION IN TELEPHONE OR LIKE SYSTEMS

Guy ffarington Bellairs, London, and John Charles Ireland, Tunbridge Wells, Kent, England, assignors to British Telecommunications Research Limited, Taplow, England, a British company Application January 24, 1948, Serial No. 4,147
In Great Britain January 27, 1947

7 Claims. (Cl. 179—15)

This invention relates to telephone and like systems. More particularly it is concerned with telephone or like systems of the kind in which calls are set up automatically over carrier frequency channels which will be referred to as communication channels.

According to a feature of the invention in order to identify a communication channel over which a connection is set up frequency ascertaining means by which the individual characters designating the communication channel are successively identified are associated with a point to which a frequency characteristic of the communication channel is adapted to be connected up when it is desired to ascertain the identity of the communication channel.

The connecting up may be effected automatically by equipment individually associated with the communication channel.

It may be desired to identify communication channels over which connections are set up for a variety of purposes such as traffic analysis and especially metering. In the latter case the connecting up of the characteristic frequency may be initiated on the response of a called substation.

The frequency ascertaining means may cause the operation of a meter associated with the calling substation by the use of conventional "marking out" circuits, or it may cause the marking or punching of a common recording means with a sign or signs characteristic of the calling substation.

Various methods of identifying the frequency of the communication channels are possible.

According to a second feature of the invention in an arrangement for identifying the individual characters of the designation of a characteristic frequency of a communication channel over which a connection is set up in a telephone or like system, a wave of the characteristic frequency or of a frequency derived therefrom is led to a set of parallel connected filters, whose pass bands together cover the possible range of frequencies which may be fed to the filters for identifying the first character, each filter having an individual responding device associated therewith, each of said filters is followed by a frequency changer to bring the combination frequencies obtained from all the mixers to a common frequency range, reduced as compared with the frequency range of the waves which may be fed to the filters, and the said combination frequencies falling within the reduced frequency range are fed to another set of parallel connected filters whose pass bands together cover the reduced frequency range and each of which has an individual responding device associated therewith, whereby a further character designating the communication channel may be identified.

According to a third feature of the invention in an arrangement for identifying a characteristic frequency of a communication channel over which a connection is set up in a telephone or like system, sets of reference frequencies one set for each character designating a communication channel are adapted to be connected up successively to be mixed in turn with a wave of the characteristic frequency or of a frequency derived therefrom so that successive resultant combination waves are enabled to pass a filter device and operates a responding device whereby successive characters designating the characteristic frequency or a group to which the characteristic frequency belongs is identified by the reference frequencies thus connected up.

According to a fourth feature of the invention in an arrangement for identifying a characteristic frequency of a communication channel over which a connection is set up in a telephone or like system in which the characteristic frequencies can be made up by mixing frequencies corresponding to the individual units, tens, etc., digits of the number of the corresponding stations, the characteristic frequency is successively mixed with waves of frequencies of a set of equally spaced reference frequencies corresponding to the possible first digits of the numbers which identify the communication channels until the combination frequency produced passes through a low-pass (or other) filter to signify the identification of the first digit whereupon the said combination frequency is successively mixed with waves of frequencies of a second set of equally spaced reference frequencies corresponding to possible second digits, of the said numbers, until the further combination frequency produced passes through a filter to signify the identification of the second digit, and so on until all the digits corresponding to the numbers of the calling communication channel have been identified.

The sets of frequencies corresponding to the digits of the numbers which identify the communication channels may be generated by frequency multiplying from a common master oscillator. Alternatively they may be generated by variable oscillators.

The invention will be better understood from the following description of possible arrangements for carrying it into effect.

Fig. 1 shows an arrangement in which a plurality of parallel connected filters F are provided, each filter passing one of the communication channel frequencies so that if a particular communication channel frequency is received a detector device D associated with the appropriate filter will be operated.

Figures 1, 2:
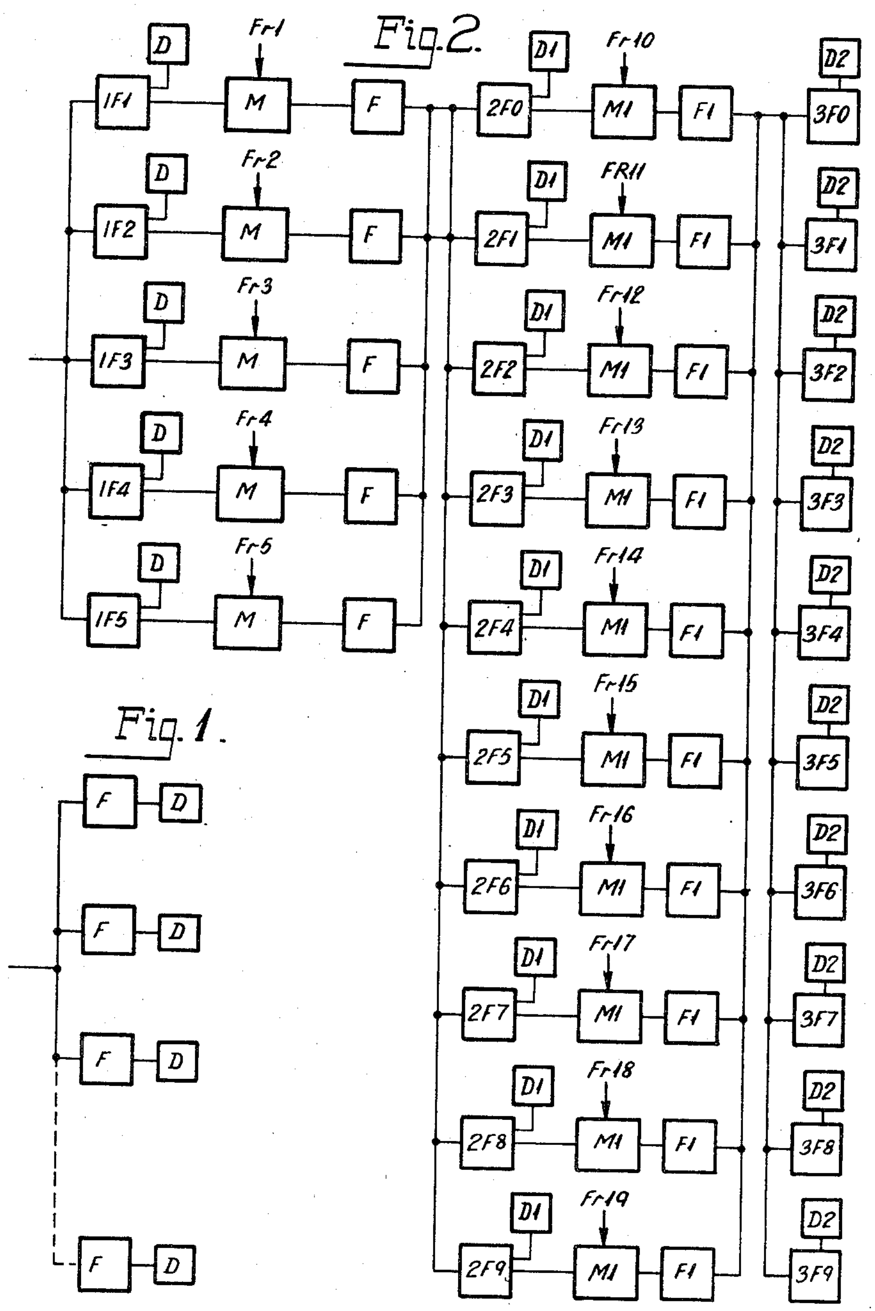
Fig. 1 shows a frequency ascertaining means.
Fig. 2 shows a second frequency ascertaining means.

When dealing with a large number of communication channels, e. g. 500, the cost of the filters or difficulty in design may come into consideration and an arrangement such as that shown in Fig. 2 may be appropriate.

Fig. 2 shows five filters IF1, IF2, IF3, IF4 and IF5 which divide the frequency range corresponding to the 500 communication channels into five parts each corresponding to a 100 channels and each being dealt with by the appropriate filter. When a communication channel frequency is passed through one of the filters the associated responding or detector device D is operated and the frequency is extended to corresponding mixer M and filter F. The five mixers M are each fed with frequency respectively, Fr1, Fr2, Fr3, Fr4 and Fr5, which are so arranged as to translate each of the five frequency ranges above mentioned into one common secondary frequency range.

The combined output of the filters F is passed to ten parallel connected filters 2F0 to 2F9.

When a communication channel frequency which will have been translated into the common secondary frequency range is received it will pass through the appropriate one of the filters 2F0 to 2F9 and operate the corresponding detector D1. It will also be passed to a mixer M1 associated with the particular filter.

A set of frequencies Fr10 to Fr19 are respectively fed to the mixers M1 and the values of these are arranged so that the frequencies passing the respective filters 2F1 to 2F9 are translated into one common tertiary frequency range.

After filtering by the low pass filter F1 the combined output is now fed to a series of filters 3F0 to 3F9.

When a communication channel frequency (which will have been translated into the common tertiary frequency range) reaches these filters it will pass the appropriate one and operate the corresponding detector D2.

Thus three detectors will be operated one each of the sets D, D1 and D2 and will give a complete identification of the communication channel frequency which has been fed to the equipment.

A suitable frequency allocation of the arrangement of Fig. 2 for the identification of a discrete frequency from a series with 8 kilocycle spacing from 41.16 to 45.152 megacycles per second might be as follows:

| Filter | Pass range in megacyles, per second |
|---|---|
| 1F1 | 41.16 to 41.952 |
| 1F2 | 41.96 to 42.752 |
| 1F3 | 42.76 to 43.552 |
| 1F4 | 43.56 to 44.352 |
| 1F5 | 44.36 to 45.152 |
| 2F0 | 17.16 to 17.232 |
| 2F1 | 17.24 to 17.312 |
| 2F2 | 17.32 to 17.392 |
| 2F3 | 17.40 to 17.472 |
| 2F4 | 17.48 to 17.552 |
| 2F5 | 17.56 to 17.632 |
| 2F6 | 17.64 to 17.712 |
| 2F4 | 17.72 to 17.792 |
| 2F8 | 17.80 to 17.872 |
| 2F9 | 17.88 to 17.952 |
| 3F0 | 1.56 |
| 3F1 | 1.568 |
| 3F2 | 1.576 |
| 3F3 | 1.584 |
| 3F4 | 1.592 |
| 3F5 | 1.600 |
| 3F6 | 1.608 |
| 3F7 | 1.616 |
| 3F8 | 1.624 |
| 3F9 | 1.632 |

The frequencies fed into the mixers could then be as follows:

| | Frequency in megacycles per second |
|---|---|
| Fr1 | 24 |
| Fr2 | 24.8 |
| Fr3 | 25.6 |
| Fr4 | 26.4 |
| Fr5 | 27.2 |
| Fr10 | 15.6 |
| Fr11 | 15.68 |
| Fr12 | 15.76 |
| Fr13 | 15.84 |
| Fr14 | 15.92 |
| Fr15 | 16.00 |
| Fr16 | 16.08 |
| Fr17 | 16.16 |
| Fr18 | 16.24 |
| Fr19 | 16.32 |

The filter F would pass all frequencies of 17.952 megacycles per second and below, and the filters F1 would pass all frequencies of 1.632 megacycles per second and below. The filters F, F1 could in fact however be dispensed with with the frequency values given above.

In the arrangements of Figs. 1 and 2 it will now be apparent that the characteristic frequencies are made up by mixing frequencies corresponding to the individual units, tens and hundreds digits of the number of the corresponding station. Such an arrangement however is not the only possible one and instead of this which is a decade system of identification, some other system such as "binary" system might be used.

A further saving in equipment in the frequency ascertaining arrangement might be effected if instead of providing a number of mixers at each stage to which fixed frequencies are connected, a single mixer were provided and a set of frequencies arranged to be connected in rotation to the modulator until the appropriate frequency to pass on the incoming wave is found.

Figure 3:
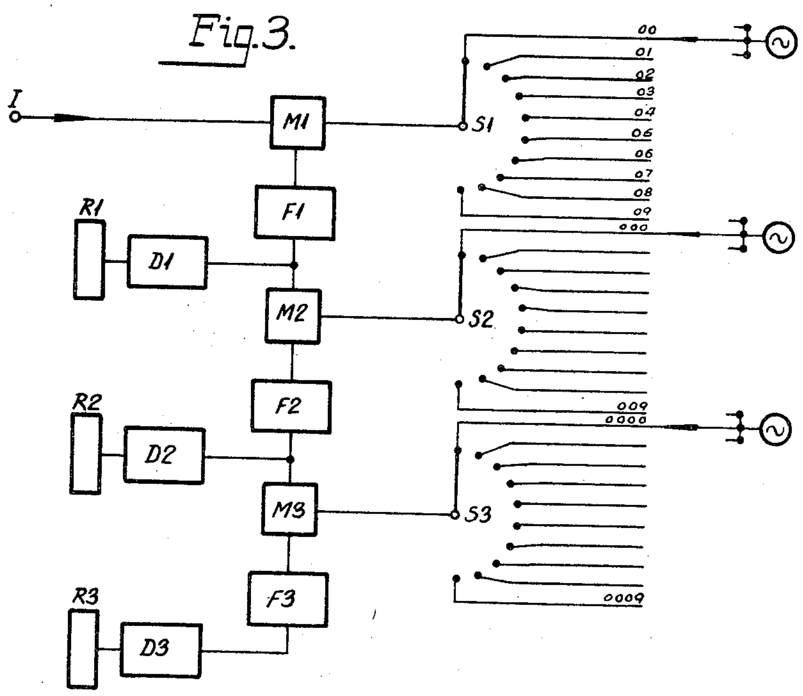
Fig. 3 shows a third preferred form of frequency ascertaining means.

Fig. 3 shows such an arrangement.

An incoming frequency connected to the point I is fed to a mixer M1. A series of equally spaced frequencies 00 to 09 are fed in turn to the mixer M1 according to the position of a ten-way switch S1 until the correct frequency is found to give a single combination frequency which will pass the filter F1 to be detected by a detector D1 and operate a relay R1 or other appropriate device. The detector D1 and relay R1 constitute a responding device and serve to cause the arrest of the wipers S1. The output of the filter F1 is also extended to a mixer M2 to which the frequency of a second set of equally spaced frequencies 000 to 009 may be connected in turn by the operation of a ten-way switch S2, which is started up by the operation of relay R1 until the appropriate combination frequency is produced to pass a filter F2 and be detected by a detector D2 to operate a relay R2 or other device which serves to arrest the wipers of S2. The output of F2 is fed to a third mixer M3 to which the frequencies of a third set of equally spaced frequencies 0000 to 0009 can be connected one at a time by operation of a ten-way switch S3 which is started up by the operation of relay R2 until the appropriate combination frequency is produced to be detected by a detector D3 and operates relay R3 or other device which serves to arrest the wipers of S3. The frequency range of the second set of frequency 000 to 009 is chosen to fall within the frequency interval of the first set 00 to 009 and the frequency range of the third set 0000 to 0009 is chosen to fall within the frequency interval of the second set.

The ten-way switches might be mechanical switches or a series of gas discharge triodes adapted to be consecutively triggered.

The frequencies for use in connection with the apparatus of Fig. 3 for the identification of a discrete frequency from the same series as was considered in connection with Fig. 2 might be as follows:

| | Frequency in megacycles per second |
|---|---|
| 00 | 24 |
| 01 | 24.8 |
| 02 | 25.6 |
| 03 | 26.4 |
| 04 | 27.2 |
| 05 | 28.0 |
| 06 | 28.8 |
| 07 | 29.6 |
| 08 | 30.4 |
| 09 | 31.2 |
| 000 | 15.6 |
| 001 | 15.68 |
| 002 | 15.76 |
| 003 | 15.84 |
| 004 | 15.92 |
| 005 | 16.00 |
| 006 | 16.08 |
| 007 | 16.16 |
| 008 | 16.24 |
| 009 | 16.32 |
| 0000 | 1.560 |
| 0001 | 1.568 |
| 0002 | 1.576 |
| 0003 | 1.584 |
| 0004 | 1.592 |
| 0005 | 1.600 |
| 0006 | 1.608 |
| 0007 | 1.616 |
| 0008 | 1.624 |
| 0009 | 1.632 |

The filter F1 would then pass frequencies of 17.952 megacycles per second and below, the filter F2 frequencies of 1.632 megacycles per second and below; and the filter F3 frequencies of 8 kilocycles per second and below.

In place of the switches S1, S2, S3 and their associated frequency sources, it will be clear that there may be provided variable-frequency oscillators or other sources each adapted to be set to produce any one of ten discrete frequencies or variable frequency filters each adapted to select one of ten discrete frequencies simultaneously applied to them.

In certain circumstances only one frequency will be fed to the frequency ascertaining means at a time but in other circumstances more than one frequency is likely to be present simultaneously especially where for economy one frequency ascertaining means is employed to meter a large number of independent equipments. In such circumstances a form of frequency finder will be necessary to ensure that only one of the frequencies is picked up at a time and fed to the frequency identifying device.

A suitable frequency finder is that described in our copending application Serial No. 4143, filed January 24, 1948. As used in connection with the present invention this frequency finder covers a given frequency range and when a characteristic frequency in this range is fed to it, it sets itself to lock in to the characteristic frequency and remains locked in until the frequency has been identified by the frequency ascertaining means. It is then released and is free to find another characteristic frequency which may be connected to it. The details of the frequency finder will appear from the following description.

Figure 4:
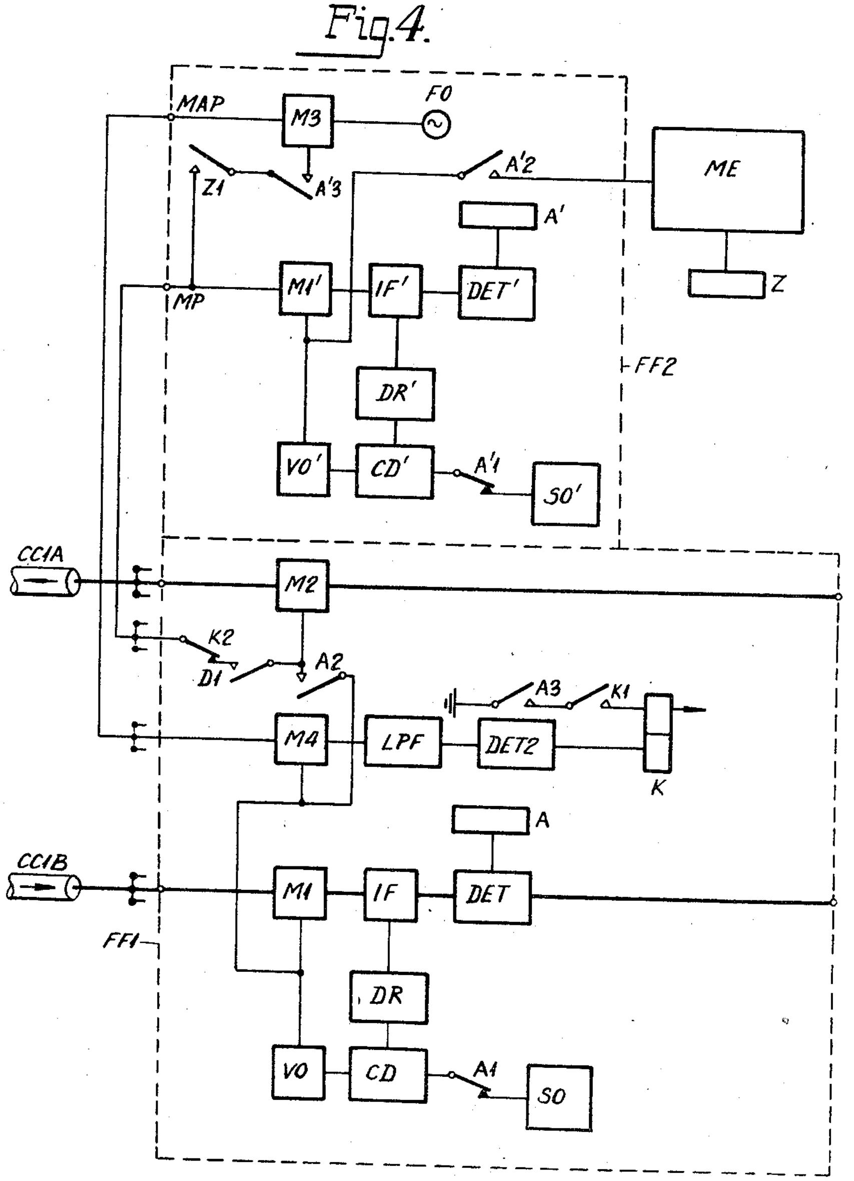
Fig. 4 shows a metering arrangement in association with the other exchange apparatus necessary for its understanding.

Fig. 4 shows the essential details of the frequency finder connected in circuit for the purpose of finding metering frequencies in a telephone system of the kind described in our copending application Serial No. 4143, filed January 24, 1948.

CC1B is a transmission path over which carrier frequencies are received and are searched for by a frequency finder FF1. The method of searching is to use a sweep oscillator SO to control the frequency of a variable oscillator VO by means of a control device CD which may be a reactance valve. The frequency from the variable oscillator is fed to a mixer M1 together with any incoming frequency over transmission path CC1B. When an incoming frequency beats with the variable oscillator frequency to give a signal which passes the intermediate filter device IF, the signal is detected by the detector DET and operates the relay A and is also passed to the discriminator DSC, which also controls the control device CD. Contact A1 of the relay A disconnects the sweep oscillator SO, and the control device CD comes under the control of the discriminator DSC which controls CD, so as to set the variable oscillator to a frequency value which will give a signal near the middle of the pass band of the intermediate filter IF.

Contact A2 of the relay A connects the variable oscillator frequency to a mixer M2 and also under the control of contact D1 relay D (not shown) which responds on reply of a called subscriber and contact K2 of relay K to a metering frequency finder FF2 which operates generally in the same manner as the frequency finder FF1 but with differences which will be described later.

The mixer M2 passes the variable oscillator frequency to the return transmission path CC1A.

When relay D subsequently operates due to the reply of the called substation as described for instance in our copending application Serial No. 4,143, filed January 24, 1948, the frequency of the variable oscillator VO will be connected to the metering point MP, and the frequency finder FF2 will proceed to find the frequency of the variable oscillator VO', in the same manner as is described for frequency finder FF1.

When relay A′ which corresponds to relay A in frequency finder FF1 operates its contact A′2 connects up frequency identifying metering equipment ME, which may be of the kind shown in Fig. 3 for example.

The identification of the frequency may be arranged to control the operation of a meter corresponding to the substation to which the frequency identified has been assigned for calling purposes or it may be caused to influence the recording on a tape or punched card or the like of the number of the substation whose frequency has been identified or otherwise used for charge assessing purposes.

When the frequency has been identified and the charge assessing apparatus operated it is arranged that a relay Z is operated and closes its contact Z1.

A fixed oscillator FO generates a frequency of 2,000 cycles which is fed to a mixer M3. With contacts Z and A′3 closed this will beat with the incoming frequency from the metering point MP and a metering acknowledge frequency will be passed to the metering acknowledge point MAP (which may be common to a number of frequency finders such as FF1).

Thence the metering acknowledge frequency is passed to a mixer M4 where it beats with the frequency from the variable oscillator VO, to give a 2,000 cycle beat note which passes the low pass filter LPF and reaches the detector DET2 to bring about operation of relay K over its lower winding. Relay K locks up over contacts A3 and K1 and at contact K2 disconnects the frequency finder FF1 from the metering point MP.

Relay A′ and relay Z will be restored and the frequency finder FF2 will thus be freed to operate to pick up other frequencies which may be connected to the metering point MP.

It will be understood that the characteristic frequency may be reconnected up at predetermined intervals while a connection exists over the communication channel so that time metering is effected.

While the above has described how single-fee metering will be effected, it will further be shown how multi-fee metering may be effected.

Figure 5:
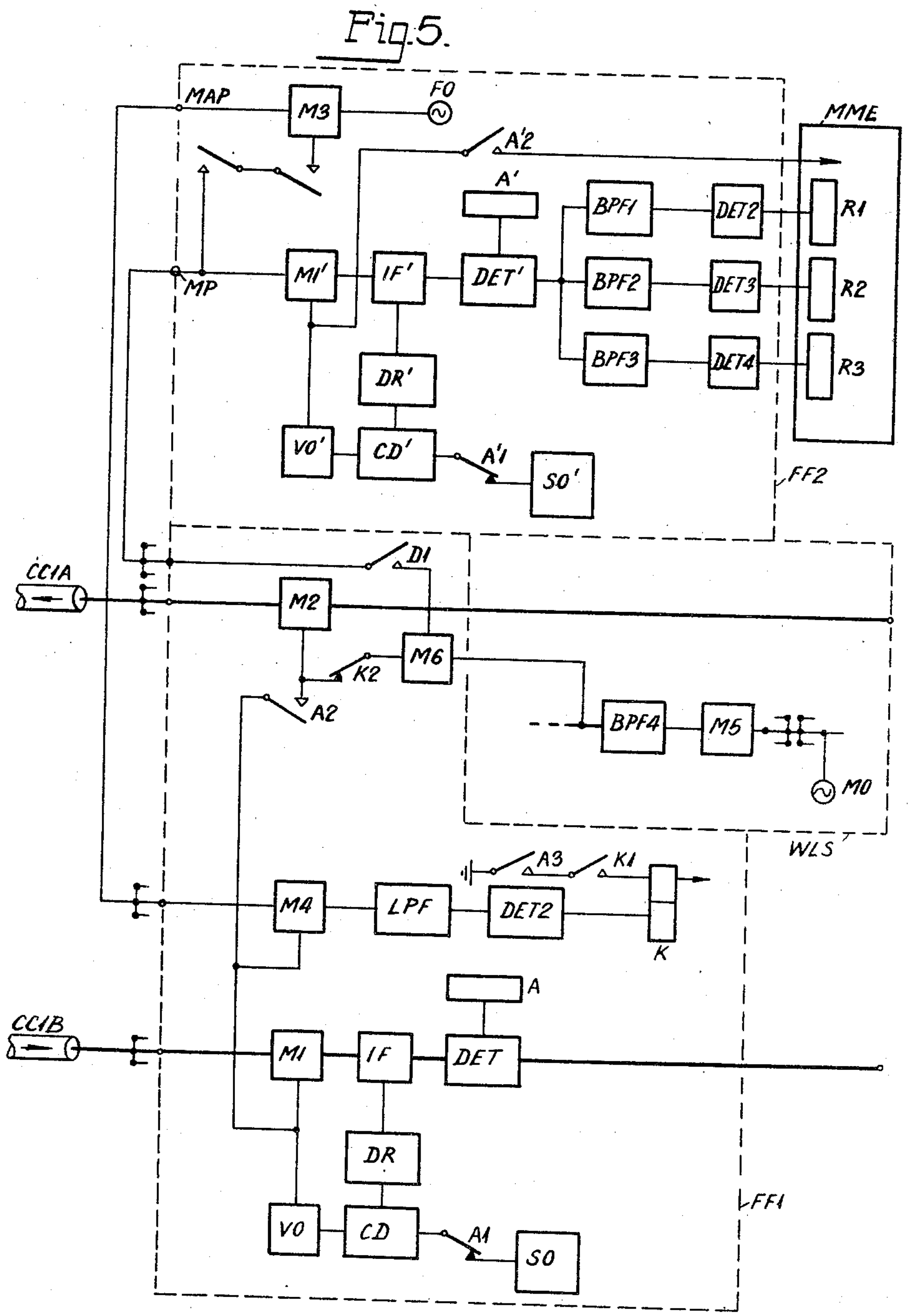
Fig. 5 shows a development of Fig. 4 to provide a multi-metering arrangement.

Fig. 5 indicates how this can be done by modulating the frequency identifying the calling subscriber with a low frequency. There is shown the essential part of the frequency finder FF1 of Fig. 4 and also the part of an exchange selector WLS, essential for understanding the functioning of the multi-metering equipment. The selector WLS is a modification of the exchange selector described more fully in our copending application Serial No. 4,143, filed January 24, 1948.

The metering frequency finder FF2 is arranged very much the same as in Fig. 4 except that it is adapted to accept modulated waves whose modulation frequency corresponds to the amount of the fee to be recorded against the wave in question. To effect this discrimination, in addition to the variable oscillator VO′ of Figure 4 which finds the carrier frequency corresponding to the calling station, the detector DET1 feeds the demodulated frequency from M1′ and IF1 to three band pass filters BPF1, BPF2 and BPF3 and these respectively feed the detectors DET2, DET3 and DET4 each of which controls the operation of a relay or other device, respectively R1, R2 and R3 in the multi-metering frequency ascertaining equipment MME, the arrangement of which will be described later.

In the exchange selector WLS there is shown one of a number of fixed frequency marker oscillators MO connected to the marker test point, one of which oscillators will correspond to each channel in the transmission path over which the connection is outgoing either permanently or under control of impulses dialled for setting up a connection.

Each marker oscillator frequency is displaced from the carrier frequency of the channel to which it applies by a small amount which may have one of three values according to whether the use of its channel is required to effect recording of a unit, double, or triple fee.

When relay D (not shown) operates in response to the reply of the wanted substation a wave having a frequency differing from the carrier frequency of the channel by said amount is connected by D1 to the metering point MP. This wave is obtained as follows: the output of the marker oscillator MO after mixing with the carrier frequency of the desired channel in M5 feeds a low frequency through the band pass filter BPF4 corresponding to the amount of displacement to mixer M6 which is an additional mixer provided in the frequency finder FF1 but which might in fact be incorporated with mixer M2. This low frequency corresponds to the frequency displacement of the marker oscillator MO and is therefore a measure of the fee to be recorded.

To mixer M6 will also be fed the frequency of the variable oscillator VO of the frequency finder FF1 and the resulting beat frequency, which frequency will be characteristic of the calling line and of the fee to be charged, will be fed to the metering point MP via contact D1 when the called subscriber replies, and will be picked up by the frequency finder FF2 in the manner previously described. The mixer M1′ serves to separate the carrier frequency characterising the calling line from the demodulating frequency characterising the fee and assuming the frequency displacement of the oscillator MO corresponds to a double fee the corresponding relay R2 will be operated and this in conjunction with the frequency identification over the lead which is extended over contact A′2 to the multi-metering equipment will bring about the twofold operation of the corresponding subscribers meter, alternatively a common record can be marked up with the subscribers identification and the fee.

It will be appreciated that instead of providing a number of marker oscillators of differing frequency displacement it would be possible to provide marker oscillators which emitted a number of pulses in accordance with the fee to be charged, which pulses would be separated out in the metering equipment.

It will also be appreciated that in order to effect metering in accordance with the duration of a call it would be possible to feed the metering frequency to the metering point MP again at say three minutes intervals during the period in which the connection is in being.

We claim:

1. In a telecommunication system, a carrier frequency identifying arrangement comprising a first identifying means for ascertaining a first character designating a carrier frequency, a second identifying means for ascertaining a second character designating a carrier frequency, a first enabling means whereby the first identifying means is caused to become operative to ascertain the first character of a particular carrier frequency, a second enabling means made operative by said first identifying means when said first character has been ascertained for enabling said second identifying means to become operative to identify the second character of said carrier frequency, whereby the characters designating said carrier frequency are ascertained successively and automatically.

2. A carrier frequency identifying arrangement as claimed in claim 1, in which the first enabling means comprises a switching device by which the carrier wave whose frequency is to be identified is connected up to the first identifying means.

3. A carrier frequency identifying arrangement as claimed in claim 2, in which a disabling device is provided which is operated when the identification of the carrier frequency is complete to render said switching device no longer effective and to cause an indication to be given corresponding to the identification which has been ascertained.

4. A carrier frequency identifying arrangement as claimed in claim 1, in which the first enabling means comprises a frequency hunting device including a variable oscillator, together with arresting means which, when the carrier frequency to be identified is found, generates a wave of the same frequency for connection to the first identifying means.

5. A carrier frequency identifying arrangement as claimed in claim 4, in which the first enabling means include filter devices and responding devices associated with each filter device by which different modulations of the carrier frequency can also be identified.

6. An arrangement for identifying the characters designating a frequency characterising a communication channel in a telecommunication system comprising a first identifying means including a first set of parallel-connected filters, each filter of the first set having a pass band which is distinctive for each of a plurality of first characters used for part of the designation of a carrier frequency, a set of individual first responding devices, each being correlated with a distinctive one of the filters of said first set, a second identifying means also including a second set of parallel-connected filters, each filter of said second set having a pass band which is distinctive for each of a plurality of second characters used for another part of the designation of a carrier frequency, the total range of the pass bands of the second set of filters being less than the pass band of a single filter of the first set and the set of individual second responding devices each being correlated with a distinctive one of the filters of the second set, a first enabling means whereby a carrier frequency is applied to the first identifying means to cause one of said first responding devices to operate to identify the first character of the designation of said carrier frequency, and a second enabling means made effective by said first identifying means to cause one of said second responding devices to operate to identify the second character of the designation of said carrier frequency.

7. An arrangement for identifying the characters designating a carrier frequency characterising a communication channel in a telecommunication system, comprising a plurality of identifying means, each including a set of sources of waves, each wave of each source of each set having a different frequency and each set having sources of waves of frequencies which are distinctive for the different part of the designation of a carrier frequency, while each source in each set is distinctive of one of the characters representing that part of the designation, a wave frequency mixing means, progressively operated means for connecting the sources of the set to which it belongs to the wave frequency mixing means of that set, filter means connected to the outlet of the mixing means and responding devices connected to the outlet of said filter means, the outlet of the filter means of one set being connected to the mixing means of a succeeding set except the last, and means for causing the successive operation of the progressively operated means of each set and effecting their arrest by the responding devices of the respective sets until characters representing the whole of the designation of a carrier frequency are identified.

GUY FFARINGTON BELLAIRS.
JOHN CHARLES IRELAND.

REFERENCES CITED

The following references are of record in the file of this patent:

UNITED STATES PATENTS

| Number | Name | Date |
|---|---|---|
| 2,039,654 | Massonneau | May 5, 1936 |
| 2,094,060 | Busch | Sept. 28, 1937 |
| 2,098,331 | Bowman | Nov. 9, 1937 |
| 2,142,663 | Topfer | Jan. 3, 1939 |
| 2,155,176 | Wicks | Apr. 18, 1939 |
| 2,218,571 | Beale | Oct. 22, 1940 |
| 2,326,737 | Andrews | Aug. 17, 1943 |
| 2,426,580 | O'Brien | Aug. 26, 1947 |
| 2,440,239 | Almquist | Apr. 27, 1948 |